Dec. 16, 1969   F. GLANDER ET AL   3,484,539
WATERPROOF AND CORROSION RESISTANT JACKETED ELECTRIC CABLE
Filed April 28, 1967
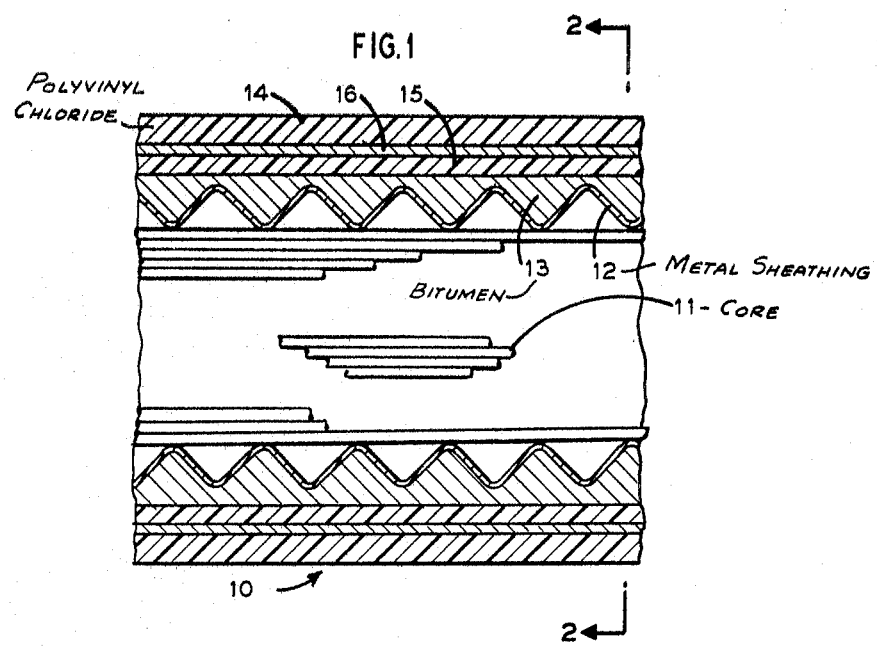
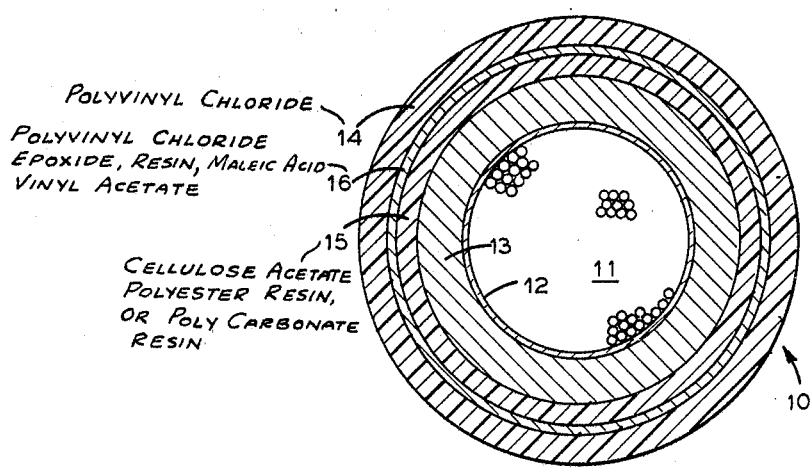
INVENTORS
Fritz Glander
Diethart Pelz
BY
ATTORNEY

United States Patent Office 3,484,539
Patented Dec. 16, 1969

3,484,539
WATERPROOF AND CORROSION RESISTANT JACKETED ELECTRIC CABLE
Fritz Glander, Hannover, and Diethart Pelz, Langenhagen, Germany, assignors to Kabel- und Metallwerke Gutehoffnungshutte, Hannover, Germany
Filed Apr. 28, 1967, Ser. No. 634,527
Int. Cl. H01b 7/18
U.S. Cl. 174—107     3 Claims

ABSTRACT OF THE DISCLOSURE

A metal sheathed electric cable having a jacketed covering comprising superposed corrosion resistant and waterproofing layers with a barrier sheet interposed between the layers.

BACKGROUND OF THE INVENTION

The invention relates to electric cables having a metal outer sheath to which is applied plastic layers of material to render the same waterproof and corrosion resistant.

While it has been proposed to use two layers of plastic material such as bitumens and synthetic resins, as protective coverings for metal sheathed electric cables; the softening or plasticizing agents used in such layers tend to migrate and to adversely affect the protective covering. Matching the plasticizer contents in the layers to avoid migration, is very difficult. The use of aggregates in the coatings tends to retard migration of plasticizer into the bitumen coating. However, such aggregates change the physical characteristics of the coatings so that their waterproofing and corrosion resisting properties are materially reduced.

It was then suggested that plastic foils be interposed between the bitumen and resin layers. While this has prevented migration of plasticizer from one layer to another, it was found that moisture tended to spread axially of the layers.

Accordingly, an object of this invention is to provide an improved jacketed electric cable wherein a plastic barrier foil is interposed between bituminous and synthetic resin protective layers; the foil being made adherent to at least one of the layers, to thereby prevent axial spread of moisture between the layers.

Another object of this invention is to provide in a cable of the character described, two layers of protective material of a plastic nature, each layer having its own plasticizer or softener; migration of such plasticizer or softener being prevented by means of an interposed barrier foil of synthetic resin; such foil being precoated with a lacquer to make the same adherent to at least one of the protective layers, thereby preventing axial spread of moisture between the protective layers.

SUMMARY OF THE INVENTION

In an electric cable having a metal jacket, protective layers of bituminous and synthetic resin materials are applied to the jacket, with a foil of synthetic resin being interposed between the protective layers. The foil is precoated with a lacquer which makes the same adherent to the resin protective layer. The coated foil may also be adherent to the bituminous layer.

BRIEF DESCRIPTION OF THE DRAWINGS

FIG. 1 shows a longitudinal sectional view of an electric cable embodying the invention; and FIG. 2 is a transverse sectional view taken on the line 2—2 of FIG. 1.

DESCRIPTION OF THE PREFERRED EMBODIMENT

As shown in FIGURES 1 and 2, 10 designates an electric cable embodying the invention. The same comprises a core 11 made up of the usual electrical conductors, all in a manner well known in the art. The core 11 is encased in a metal sheathing 12, which is preferably of a corrugated construction, to render the cable flexible. The sheathing 12 may be made of selected metals or metal alloys, including copper, aluminum, steel and the like.

Over the sheathing 12 there is applied a protective coating of a bituminous nature, using bitumen or other materials of similar character, known in the art, said coating being indicated at 13. An outer protective coating 14 is provided, such coating being of a synthetic resin, such as polyvinyl chloride or the like.

Between layers 13, 14 there is interposed a barrier foil 15 of a synthetic plastic material which can withstand a mean temperature of about 40° C. to about 50° C., without changing its shape. Foil 15 may be formed suitably of cellulose acetate, polyester resins, polycarbonate resins, and other materials having similar characteristics.

Before interposition of foil 15 between layers 13, 14; the foil is precoated as by spraying, dipping or the like, with a lacquer indicated at 16. Lacquer 16 shows excellent adherence to the polyvinyl chloride coating 14. Such lacquer 16 may be formulated as follows:

| | Parts |
|---|---|
| Polyvinyl chloride | 3.70 |
| Epoxide resin | 1.27 |
| Maleic acid | .03 |
| Vinyl acetate | .50 |
| Solvent-acetone (by weight) | 94.50 |

The epoxide resin, maleic acid and vinyl acetate acts as a composite binder for adhering the polyvinyl chloride content of the lacquer to the coating 14 and the foil 15.

The lacquer coating 16 on foil 15 is highly effective in making said foil tightly adherent to outer layer 14 throughout their coextensive surface areas. Thus, the spread of moisture axially of layer 14 and foil 15, is prevented. The foil 15 is also adherent to layer 13, further insuring waterproofness throughout the length of cable 10.

As various changes might be made in the herein disclosed embodiment of the invention without departing from the spirit thereof, it is understood that all matter herein shown or described, shall be deemed illustrative and not limiting except as set forth in the appended claims.

We claim:
1. In an electric cable having a core element of electrical conductors and a metal sheathing enclosing said core element; a protective outer covering for said sheathing, said covering comprising an inner layer of softened bituminous material and an outer layer of plasticized synthetic resin material, a barrier foil of synthetic plastic material interposed between said inner and outer layers to prevent cross migration of softener and plasticizer between said inner and outer layers, and lacquer adhesive for securing said foil to said inner and outer layers throughout the length thereof to prevent the spread of moisture or water axially between said outer layer and said foil, said lacquer adhesive consists of polyvinyl chloride, epoxide resin, maleic acid, vinyl acetate and oragnic solvent.

2. An electric cable as in claim 1 wherein said outer layer is polyvinyl chloride.

3. An electric cable as in claim 1 wherein said barrier foil is formed of a material selected from the group consisting of cellulose acetate, polyester resin and polycarbonate resin.

(References on following page)

References Cited

UNITED STATES PATENTS

| | | | |
|---|---|---|---|
| 1,786,340 | 12/1930 | Gardner | 174—110 |
| 2,234,353 | 3/1941 | Quinlan. | |
| 2,707,205 | 4/1955 | Abbott et al. | 174—110 |
| 2,759,991 | 8/1956 | Rheiner et al. | 174—120 |
| 2,866,775 | 12/1958 | Sellers | 161—233 X |
| 3,074,834 | 1/1963 | Matlin et al. | 161—233 X |
| 3,086,888 | 4/1963 | Stratton et al. | 117—212 |
| 3,345,455 | 10/1967 | Goody. | |
| 3,355,427 | 11/1967 | Lancrini. | |
| 2,688,652 | 9/1954 | Schumacher | 174—102 |
| 1,914,897 | 6/1933 | Schade | 174—107 |

FOREIGN PATENTS

| | | |
|---|---|---|
| 548,014 | 9/1956 | Italy. |
| 617,003 | 3/1961 | Canada. |
| 792,228 | 3/1958 | Great Britain. |
| 973,485 | 3/1960 | Germany. |

LARAMIE E. ASKIN, Primary Examiner

A. T. GRIMLEY, Assistant Examiner

U.S. Cl. X.R.

138—141